United States Patent [19]
Anderson et al.

[11] Patent Number: 4,589,042
[45] Date of Patent: May 13, 1986

[54] COMPOSITE THIN FILM TRANSDUCER HEAD

[75] Inventors: Nathaniel C. Anderson, Pine Island, Minn.; Robert E. Jones, Jr., San Jose, Calif.

[73] Assignee: International Business Machines Corporation, Armonk, N.Y.

[21] Appl. No.: 508,207

[22] Filed: Jun. 27, 1983

[51] Int. Cl.[4] ............... G11B 5/12; G11B 5/22; G11B 5/20
[52] U.S. Cl. ............... 360/125; 360/122; 360/123
[58] Field of Search ............... 360/119, 120, 122, 123, 360/125, 126

[56] References Cited
U.S. PATENT DOCUMENTS
4,190,872  2/1980  Jones, Jr. et al. ............... 360/122

Primary Examiner—John H. Wolff
Attorney, Agent, or Firm—Robert W. Lahtinen

[57] ABSTRACT

A film type magnetic transducer head has a yoke formed partially of high permeability material which provides enhanced read capabilities and partially of high saturation magnetization material to obtain the write function benefits associated therewith. The high saturation magnetization material is used in the pole tip region and extends to a location beyond the point of initial saturation and does not extend to a position at which the first coil winding is embraced to prevent or minimize coupling with the windings. With the balance of the joke of high permeability material, the transducer functions substantially as a wholly high saturation magnetization yoke in the write function and as a wholly high permeability material yoke for read purposes.

7 Claims, 6 Drawing Figures

COMPOSITE THIN FILM TRANSDUCER HEAD

BACKGROUND OF THE INVENTION

This invention pertains to a film magnetic transducer head and more particularly to an improved film transducer head having an improved combination of writing and reading capabilities.

In a magnetic transducer, a given combination of pole tip and gap dimensions, film thickness and yoke geometry using high saturation magnetization alloy have proved to be superior to a high permeability alloy with respect to the ability to write high coercivity recording media. A typical high saturation magnetization alloy is 45/55 nickel-iron (Ni Fe) and a common high permeability alloy is 81/19 Ni Fe. At the location where the pole tip region initially saturates, the high saturation magnetization 45/55 Ni Fe alloy permits more flux to be transmitted to the pole tips and to the recording media. Typical thin film transducer head strutures having a yoke structure formed of a single magnetic material is shown in U.S. Pat. No. 4,190,872.

Unfortunately, heads made of 45/55 Ni Fe alloy also exhibited two problems: there is a relatively large irreproducibility in signal amplitude, and the readback amplitude is low. The standard deviation of amplitudes after successive write operations is typically 10 percent for 45/55 Ni Fe heads whereas in a typical product using 81/19 Ni Fe heads, there is an amplitude deviation specification of less than 4 percent. The reason for this scatter is not fully understood, although it is known to be associated with high positive magnetostriction materials and irreproducible domain structures in the head. These irreproducible and unsymmetrical domains are particularly prevalent in the back portions of the head. Closure domains in the pole tip region, although in principle undesirable, are more regular and reproducible in occurrence. The readback amplitude of 45/55 Ni Fe heads is relatively low because of the lower permeability of the material, typically 1300-1400 as compared to 2000-2500 81/19 Ni Fe. For a given geometry, lower permeabilies give rise to lower head efficiencies.

SUMMARY OF THE INVENTION

The problem of differing transducer read-write characteristics can be resolved by using separate heads, each optimized to the function for which it is exclusively used. Use of dual heads gives rise to transducer fabrication problems or head alignment and track registration problems, particularly in high track density environments. The more likely circumstance is that both problems will be encountered.

In the composite head design of the present invention, the instabilities associated with high saturation magnetization heads are diminished by using material such as 45/55 Ni Fe only in the pole tip region of the yoke structure to eliminate most of the regions where domain instabilities can exist. The 45/55 Ni Fe material extends beyond the location of initial saturation, but does not embrace the first winding of the coil surrounded by the yoke.

In the present invention a single head is composed of composite materials in the magnetic flux path. The pole tips are formed of high saturation magnetization material. Restriction of this material to the pole tip region diminishes the instabilities. The high saturation magnetization material is limited to the pole tip region and does not extend to embrace and couple the first winding of the flat coil. Use of the high saturation magnetization material at the pole tip so as to extend beyond the point of initial saturation enables the composite head to perform the write function substantially as a transducer with a yoke made wholly of high saturation magnetization material. Conversely by limiting the high saturation magnetization material such that coupling with the windings does not occur or is minimized, the transducer has substantially the same reading efficiency as a head with the yoke totally composed of high permeability material. By observing the structural constraints, the optimum conditions obtained by the selective use of the desired yoke materials for both writing and reading may be obtained in a single composite transducer structure.

DETAILED DESCRIPTION

Figure 2:
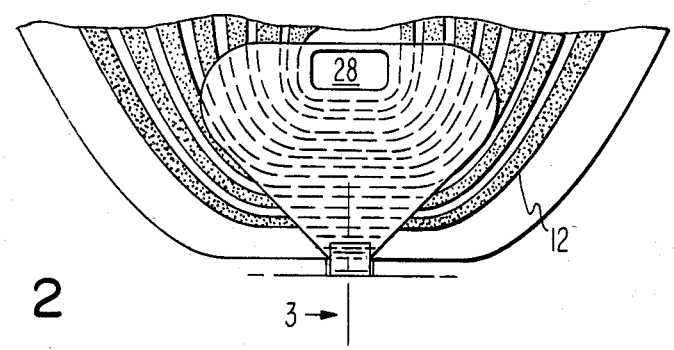
FIG. 2 is a partial plan view of the yoke and winding of the thin film transducer of FIG. 1.
Figure 1:
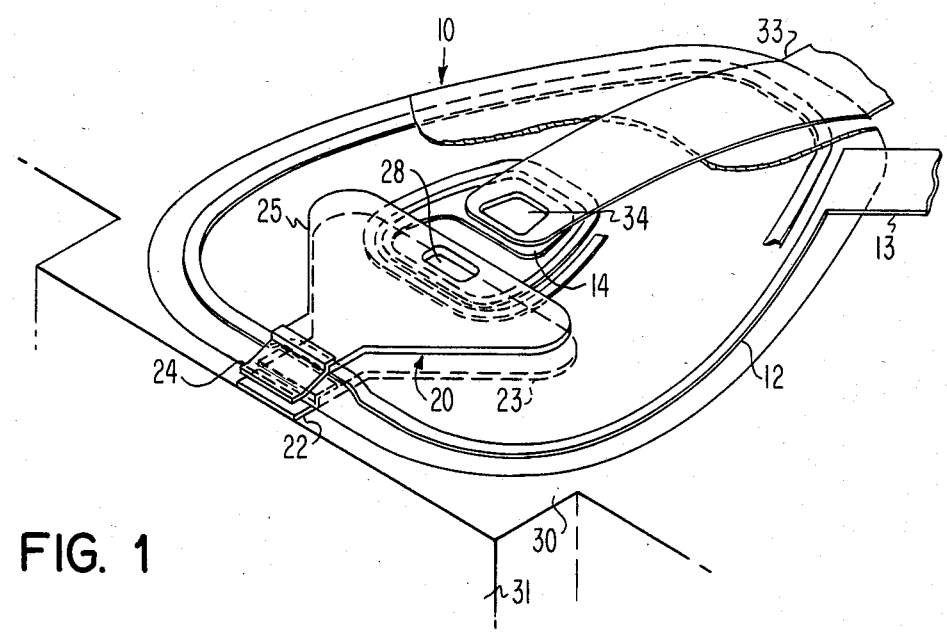
FIG. 1 is an enlarged perspective view partially broken away of a thin film transducer embodying the invention.

As illustrated in the drawings the thin film transducer 10 that includes the invention comprises a flat conductor coil 12 that includes a series of turns extending from an electrical contact 13 to a central terminal end pad 14. The conductor coil turns 12 are plated in an eliptical pattern between two layers 16, 17 of insulating material. A yoke structure 20 having two composite layers each including a pole tip region and a back region. The lower layer has a pole tip portion 22 and a back region 23 and the upper layer has a pole tip portion 24 and a back region 25. In the pole tip region the yoke layers 22, 24 are separated by a gap material layer 26 that defines the transducing gap. The balance of the yoke layers are separated by insulating layers 16, 17 in addition to the gap material 26 with the exception of the back gap region 28 where the insulating layers are excluded and the yoke layer back regions are in intimate contact to provide a continuous path of magnetic material extending from the transducing gap and surrounding the conductor turns 12. The conductor turn portions extending through the yoke 20 are of narrower width than the remainder of the coil.

The substrate 30 is a transducer carrying slider on which the transducer gap is aligned with the rail or air bearing surface 31 that confronts the magnetic media surface to which data is written and from which data is read. The transducer further comprises a connector terminal 33 that makes electrical contact at 34 with the central terminal end pad 14 of the flat conductor. Terminal 33 and electrical contact 13 provide the conductors which connect to external circuitry. Connector 33 can either pass under or over the coil 12 depending on desired final structure.

Figure 3:
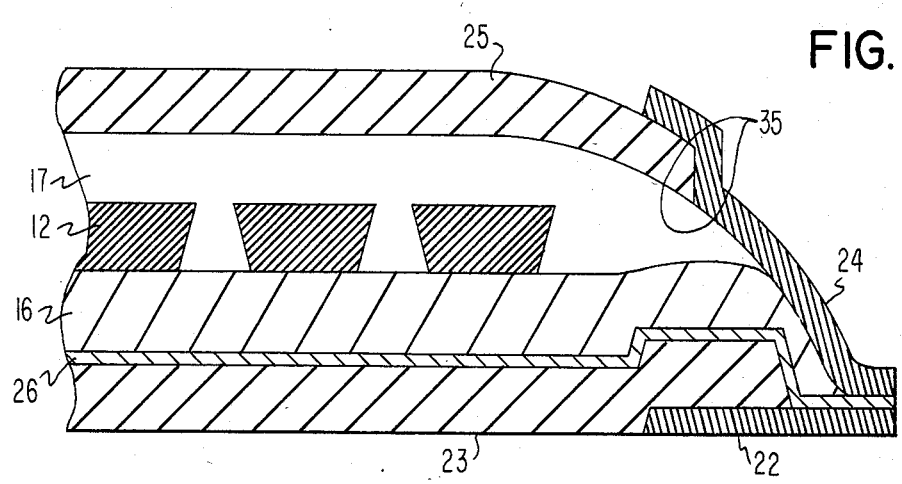
FIG. 3 is a section view of the thin film transducer of FIG. 1 taken along line 3—3 of FIG. 1.

The pole tips are formed of high saturation magnetization material which in the described embodiment is identified as 45/55 Ni Fe. However, this high saturation magnetization portion could also be formed of other materials having appropriate magnetic and physical properties such as NiFeCo or plain iron. FIG. 3 shows the pole tip layers 22, 24 respectively underlying the lower back region layer 23 of high permeability material and overlying the upper back region layer 25 of high permeability material. The transducer yoke 20 of the present invention is fabricated to provide high saturation magnetization alloy material in the pole tip region and high permeability alloy material in the yoke back region. The pole tip high saturation magnetization alloy material extends beyond the point of initial saturation 35 and the yoke and winding design is configured such that the pole tip, high saturation magnetization material does not embrace and couple the initial winding convolution.

As seen in FIG. 3, the lower pole tip portion 22 is first formed by applying a sputtered conductive coating of a conductive material such as Ni Fe. Although other metal coatings provide the surface conductivity function, the use of Ni Fe precludes the subsequent occurrence of electrolytic action between the conductive coating and the plated layer of Ni Fe which forms the yoke portion. After applying the conductive film or coating, the surface is masked by coating, exposing and developing photoresist material to define a desired lower pole tip and electroplating a high saturation magnetization alloy such as 45/55 Ni Fe to the desired pole tip thickness. The remaining photoresist is then stripped and the surface recoated with photoresist which is then exposed and developed to define the back region of the yoke layer 23 in partially overlying relation with respect to the pole tip layer 22. The back region 23 is then formed by plating a desired thickness of high permeability alloy such as 81/19 Ni Fe.

After the initial layer of the yoke 20, including the pole tip portion 22 and back region 23, has been fabricated on the substrate 30, a sputtered dielectric layer 26 such as alumina is applied to the entire transducer surface with the exception of the yoke back gap area 28. This layer is applied to a thickness that defines the gap between the terminal portions of the yoke pole tips 22, 24. Although the gap material provides insulation, the thickness is not sufficient to assure a continuous isolation of the first yoke layer from subsequently fabricated windings 12, since this hard, wear resistant material may be discontinuous at edge surfaces. To assure edge protection, a further insulating layer 16 is applied to the transducer surfaces with the exception of the yoke pole tip transducer gap region between layers 22 and 24 and the back gap region 28. The flat coils 12 are thereafter applied using photoresist masking techniques and electroplating. A further insulating layer 17 is then applied (excluding the pole tip region between layers 22 and 24, back gap 28 and electrical terminal contact area 34).

Preparatory to application of the second composite layer of the yoke assembly, the surface has a film of high saturation magnetization alloy applied by vacuum deposition to impart conductivity. In an environment using 45/55 Ni Fe high saturation magnetization material for the pole tip regions, the same material should be used to provide the conductive film. Although any Ni Fe material would serve the function of providing a conductive surface without possible future electrolytic action, the use of a high permeability material may have adverse effects. In the event that saturation occurs in this conductivity layer with the attendant termination of flux change, the layer effectively adds to the gap length. As the gap length becomes smaller in transducers adapted for higher aerial densities, the coating thickness becomes a larger percentage of the gap length, and its addition to the length (which can presently be anticipated to be as much as 50 percent) is probably not tolerable in high density recording applications.

The upper yoke layer back region 25 and the terminal strap area is then masked by applying photoresist material which is exposed to define the area where these elements are to be formed and developed. The second area of high permeability alloy is then plated to the desired thickness in this back region which is plated directly onto the lower yoke layer 23 of high permeability alloy at the back gap region 28. The photoresist is then stripped and another layer of photoresist applied which is exposed and developed to define the upper pole tip region which overlies the high permeability back region layer 25 beyond the point 35 at which initial saturation occurs in a single material yoke member. Plating the pole tip area material and removal of the photoresist masking material then completes the final material additive step of the head fabrication.

Figure 4:
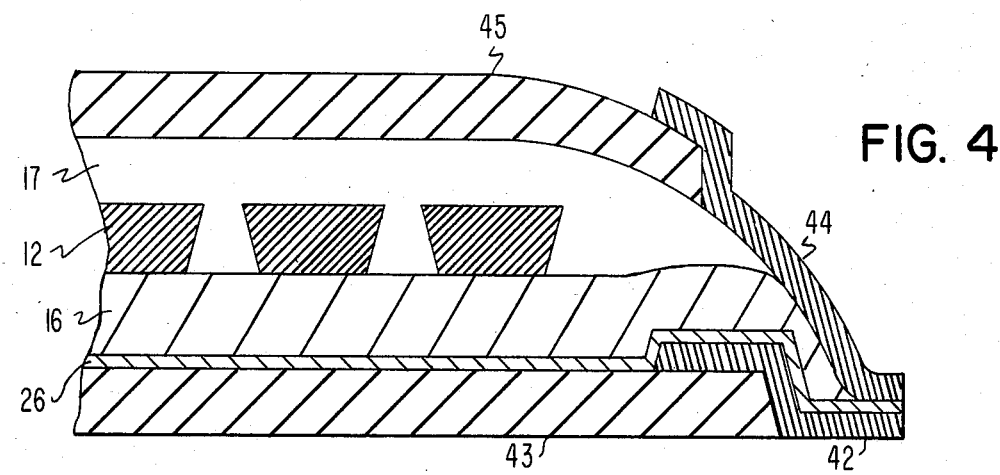
FIG. 4 is a section view similar to FIG. 3 showing an alternative embodiment of the pole tip assembly.

FIG. 4 illustrates an alternative embodiment wherein both composite material yoke layers are fabricated in the same sequence. The high permeability material of the lower back region 43 is initially deposited followed by the high saturation magnetization material pole tip layer, and after application of a gap layer 26, insulation layers 16, 17 and winding 12, the high permeability upper back region 45 is formed followed by the high saturation magnetization pole tip 44.

Figures 5, 6:
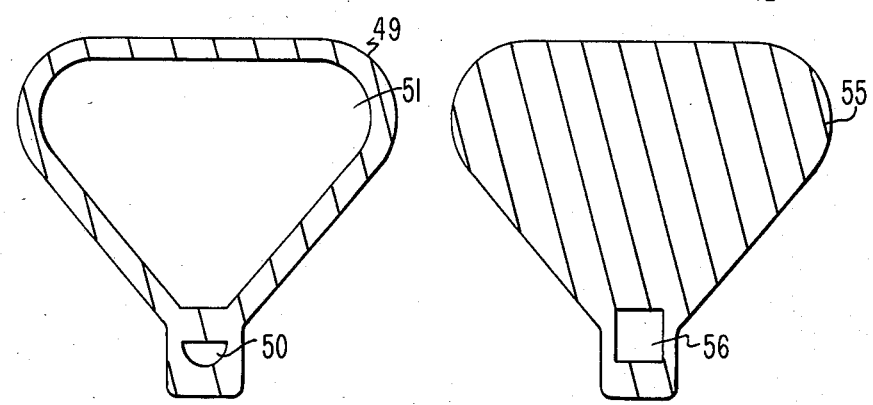
FIG. 5 is a plan view of a typical mask pattern applied to a nickel-iron plating base to form the yoke pole tip region of the thin film transducer of FIG. 1.
FIG. 6 is a plan view of a typical mask pattern applied to a nickel-iron plating base to form the yoke back region of the thin film transducer of FIG. 1.

FIGS. 5 and 6 respectively illustrate typical photoresist mask patterns used to form the pole tip region and the back region. The pattern for masking the back region 51 also defines a salvage area 50. The mask 55 with an opening 56 defining the pole tip region causes the pole tip layer to overlie the back region layer portion at one end and the salvage region layer portion at the end opposite said one end. In the final configuration, the entire salvage layer portion and part of the pole tip layer portion are removed. The salvage layer portion is provided for processing purposes only.

Although the figures illustrating the transducer of this invention show the head enlarged for purposes of illustration, the film head is actually very small. The total thickness of the entire assembly including permalloy yoke layers, gap material, two layers of electrical insulation and the coil is less than 15 micrometers. The schematic showings of FIGS. 3 and 4 are more than 150,000 times actual size. When the layer of gap material establishes a gap between the pole tips of 4,000 angstroms, a 1,000 angstrom conductive film, if the same should saturate and add to the effective gap length would cause a 25 percent increase.

While the invention has been particularly shown and described with reference to preferred embodiments thereof, it will be understood by those skilled in the art that various changes in form and detail may be made therein without departing from the spirit and scope of the invention.

What is claimed is:

1. In a composite film magnetic transducer head including a yoke with two layers of magnetic material having physical contact at a back gap region to provide a continuous path of magnetic material between a pair of pole tips that form the transducing gap and a series of electrically insulated conductor windings extending through said yoke between said magnetic material layers, the improvement comprising:

pole tips of said yoke being formed of a high saturation magnetization alloy extending the transducer gap to a location beyond the point of initial saturation and the balance of said layers of material forming said yoke being formed of high permeability material with the pole tip portions being in intimate contact with the high permeability yoke material to form said continuous path of magnetic material from one side of said transducing gap to the other side of said transducing gap.

2. The composite film magnetic transducer head of claim 1 wherein said high saturation magnetization alloy is 45/55 Ni Fe alloy and said high permeability magnetic material is 81/19 Ni Fe alloy.

3. The composite film magnetic transducer head of claim 1 wherein said high saturation magnetization alloy material layers respectively partially overlie and are in intimate contact with the cooperating high permeability layer portions and said high saturation magnetization alloy material layers form a portion of said yoke without a convolution of said conductor windings disposed there between.

4. The composite film magnetic transducer head of claim 1 wherein said high saturation magnetization alloy material layers respectively overlie and are in intimate physical contact with said high permeability layer portions with said overlying portions of said high permeability layer portions disposed between said high saturation magnetization alloy material layer portions.

5. The composite film magnetic transducer head of claim 1 further comprising a layer of dielectric material that overlies the first formed pole tip layer and establishes the gap thickness between such first form pole tip layer and a second, subsequently formed, plated pole tip layer, and a first Ni Fe plating film that overlies at least the pole tip region of said pole tip layer to form a plating base for application of said second, plated pole tip layer.

6. The composite film magnetic transducer head of claim 5 wherein said first Ni Fe plating film is a high saturation magnetization alloy.

7. The composite film magnetic transducer head of claim 6 further comprising a second Ni Fe plating film underlying said first form pole tip layer to form a plating base for the application of said first formed pole tip layer.

* * * * *